United States Patent [19]

DeJong

[11] 3,886,088

[45] May 27, 1975

[54] PROCESS FOR THE PREPARATION OF A GRANULAR ACTIVATED CARBON, AND GRANULAR ACTIVATED CARBONS PRODUCED THEREBY

[75] Inventor: Geert J. DeJong, Boekelo, Netherlands

[73] Assignee: Akzo N.V., Arnhem, Netherlands

[22] Filed: July 30, 1973

[21] Appl. No.: 383,668

[30] Foreign Application Priority Data
Aug. 3, 1972 Netherlands .................... 7210632

[52] U.S. Cl. .................... 252/422; 201/2.5; 201/25; 423/449
[51] Int. Cl. ............................................ C01b 31/08
[58] Field of Search ............... 252/422; 201/25, 2.5; 423/449; 260/2.3

[56] References Cited
UNITED STATES PATENTS

| | | | |
|---|---|---|---|
| 2,234,769 | 3/1941 | McCulloch | 252/422 |
| 2,516,233 | 7/1950 | McKinnis | 252/445 |
| 2,585,454 | 2/1952 | Gamson | 252/422 |
| 2,809,938 | 10/1957 | Goren | 252/422 |
| 2,829,115 | 4/1958 | Bushong | 252/422 |
| 3,248,303 | 4/1966 | Doying | 252/422 |
| 3,436,312 | 4/1969 | Leonor | 201/25 |
| 3,630,959 | 12/1971 | Kiikka | 252/422 |
| 3,772,242 | 11/1973 | Liska et al. | 252/421 |

*Primary Examiner*—Winston A. Douglas
*Assistant Examiner*—P. E. Konopka
*Attorney, Agent, or Firm*—Stevens, Davis, Miller & Mosher

[57] ABSTRACT

A process for the preparation of a granular activated carbon by treating synthetic and/or natural rubber in the form of cut up or ground rubber objects with sulphur, sulphuric acid, sulphur trioxide, chlorosulphonic acid and/or sulphuryl chloride in an amount of 0.05 to 12 parts by weight per part by weight of the rubber and pyrolysing the treated rubber at a temperature of 350° to 1000°C.

4 Claims, No Drawings

3,886,088

PROCESS FOR THE PREPARATION OF A GRANULAR ACTIVATED CARBON, AND GRANULAR ACTIVATED CARBONS PRODUCED THEREBY

This invention relates to a process for the preparation of an activated carbon carried out by pyrolysis of an organic substance.

It is known for an activated carbon to be prepared by pyrolysis and subsequent activation, if desired, of naturally occurring substances such as sawdust, peat, brown coal and coconut shells; optionally, such compounds with a carbohydrate structure may be heated in the presence of a dehydrating agent such as sulphuric acid, phosphoric acid or an aequous solution of zinc chloride. Furthermore, it is known to prepare an activated carbon from linear or crosslinked high-polymers. However, except when using ion exchanging resins, only low yields of activated carbon are obtained due to the loss of material by depolymerisation and the formation of gaseous products and carbon (see, for instance, the East German Pat. Specification No. 27, 022).

It is also known for waste rubber, such as discarded tyres, to be burnt in the open air or to be subjected to dry distillation, which may give rise to the formation of oily, tarry and gaseous products and, possibly, to a very soft carbon black residue, which is obtained in an amount by weight about one-third of that of the initial product. Presumably, this is just about the carbon black originally added as such to the rubber. It may therefore be assumed that in such a process the rubber itself is not converted into a solid residue but into liquid and gaseous products. The solid residue is reported to be suitable for use as rubber filler (see, for instance, Chem. Engng. News, 48, No. 42, pp. 8–9, Mod. Tire Dealer, 50, No. 6, Part I, January 1969, p. 10, and Rubber Journ., 151, No. 3, March 1969, pp. 69–70). The carbon black residue is unfit for use as an absorbent because of its insufficiently large internal surface area and very low mechanical strength.

Surprisingly, there has now been found an excellent process for the manufacture of a granular, hard, activated carbon in an inexpensive and simple manner by subjecting a synthetic and/or a natural rubber in a particular form to a particular reaction with sulphur or a sulphur containing compound prior to or during the pyrolysis.

The process according to the invention is characterized in that a granular, activated carbon is prepared by treating synthetic and/or natural rubber in the form of cut up or ground rubber objects with a sulphur-containing reactant selected from the group consisting of sulphur, sulphuric acid, sulphur trioxide, chlorosulphonic acid and sulphuryl chloride in an amount of 0.05 to 12 parts by weight per part by weight of the rubber and pyrolysing the treated rubber at a temperature of 350° to 1000°C.

An advantage of this process is that in the pyrolysis of the rubber the formation of volatile organic substances is suppressed, resulting in a yield of the valuable granular activated carbon which is approximately 3 times as high as that obtained with the pyrolysis of the rubber not being treated with the sulphur-containing reactant. It has also been found that the granular activated carbon has a proper texture and a high bulk density. Moreover, it is of advantage that the scrap tires, which form a tremendous environmental problem, can be converted into a granular carbon which in its turn may solve other environmental problems.

The sulphur-containing reactant to be used according to the process of the invention, may be used as such, but it is also possible to employ mixtures thereof. Likewise, it is possible for the sulphur-containing reactants to be prepared in situ. For instance, use may be made of a mixture of sulphur trioxide and hydrochloric acid instead of chlorosulphonic acid, or a mixture of sulphur dioxide and chlorine in place of sulphuryl chloride. By preference use is made of sulphuric acid.

Moreover, the process according to the invention permits the incorporating of organic substances in the product to be pyrolysed, as a result of which the yield of activated carbon may increase to more than 1 part by weight per part by weight of the rubber starting material.

Examples of compounds that are suitable to be incorporated in the above-described manner are monofunctional compounds such as toluene sulphonic acid, phenol sulphonic acid, phenol, and bitumen, tars and bottom products resulting from the distillation of organic compounds. Or course the use of these compounds is economically attractive if they occur as contamination in the sulphur-containing reactant applied, which may be waste sulphuric acid, or in the form of waste materials.

Although not strictly necessary, the reaction of the rubber with the sulphur-containing reactant may take place in the presence of an inert solvent or diluent. Such a dispersent preferably is a swelling agent for the rubber used. Suitable dispersants are chlorinated hydrocarbons such as carbon tetrachloride, ethylene dichloride and higher chlorinated hydrocarbons, as well as sulphur dioxide. The amount of dispersant to be used is not critical; amounts of not more than 10 parts by weight, more particularly of 1 to 4 parts by weight per part by weight of rubber are generally sufficient. The use of amounts higher than 10 parts by weight is also possible, but offers no additional advantages.

The temperature to be chosen for carrying out the reaction between the rubber and the sulphur-containing reactant is generally dependent on the said reactant used, and on the nature and the amount of the inert dispersant (if any). The reaction may, for instance, be carried out at a relatively low temperature of, say, − 20° to 300°C.

The reaction of the rubber with the sulphur-containing reactant may merge into the pyrolysis of the rubber. Or the reaction with the sulphur-containing reactant may be carried out simultaneously with the pyrolysis. The time required for carrying out the reaction with the sulphur-containing reactant is dependent on the reaction conditions, and will generally range between about 30 minutes and 24 hours.

The rubber to be used in the process according to the invention may in general be any type of synthetic rubber or natural rubber. Very suitable are natural rubber, styrene-butadiene rubber and polybutadiene rubber or mixtures thereof.

The rubber appears in the form of cut up or ground rubber objects. As a source of rubber it is preferred to use worn tyres of all sorts of motor vehicles or other articles comprising a rubber material, such as conveyor belts.

Naturally, the rubber in the form of cut up or ground rubber objects contains compounds such as carbon black and other fillers, and reinforcing materials such as fibres. Wherever in this application weight proportions are indicated to be based on rubber, the weight of the rubber is meant to include that of materials originally contained in the scrap rubber object and still being present in said rubber. The rubber articles may in any suitable manner be cut up or ground; if desired, after the removal therefrom of metal parts, for instance the bead wires of motor-car tyres.

For carrying out the reaction with the sulphur-containing reactant it is not strictly necessary to use rubber particles of small size, say of about 1 mm; larger particles, such as rubber crumbs measuring between 3 and 10 mm, by preference 2–4 mm, are also suitable for being treated in the process according to the invention.

The pyrolysis of the rubber pre-treated in the process according to the invention is carried out in the usual manner; in general by heating at a temperature between 350° and 1000°C. The activated carbon obtained in the pyrolysis may be further activated by roasting. This may take place in the usual manner, for instance by heating the carbon at a temperature between, say, 700° to 1000°C with the use of steam or carbon dioxide, or between 350° and 550°C with air as the heating medium.

On the whole, activated carbons which have not been subjected to continued activation mainly have micropores that can be determined with the aid of $N_2$-porosimetry (pore diameter smaller than approximately 50 Å). Activation with air, steam, etcetera, causes the volume of the micropores to increase, and also gives rise to the formation of mediumsized pores having a diameter of a few hundred to a few thousand Angstrom units.

The activated carbon according to the invention, which may have been subjected to continues activation, can very suitably be used for the treatment of industrial waste water and other liquids, as well as for the treatment of gases and vapours.

EXAMPLE I

A mixture of 10 parts by weight of rubber containing 90% by weight of a styrene butadiene rubber and 10% by weight of a natural rubber, 60 parts by weight of carbon tetrachloride and 25 parts by weight of sulphuryl chloride was heated under reflux to a temperature of 70°C. The rubber had been obtained from a passenger tyre which had been cut into pieces measuring 5 to 10 mm.

During heating, the hydrochloric acid gas and sulphur dioxide formed were allowed to escape. After a reaction time of 6 hours the dispersing agent was destilled off, with the granules being retained in the dry state. After a pyrolysis carried out at 500°C, there was obtained a very hard, activated granular carbon having an internal surface area 400 m²/g and a bulk density of 0.65 g/ml. After the granular carbon had been activated with steam (50% combustion), it still has a very satisfactory mechanical strength; the internal surface area was 800 m²/g then.

EXAMPLE II

A mixture of 10 parts by weight of the cut up tyre rubber of Example I, but having a particle size of 1 to 2 mm and 40 parts by weight of waste sulphuric acid was heated in a rotating tube, the temperature being gradually increased to 250°C over a period of 4 hours. The waste sulphuric acid had been obtained in the sulphonation of toluene and contained 80% sulphuric acid, 10% toluene sulphonic acid and 10% water. In the afore-mentioned heating step the sulphuric acid was almost entirely reduced to $SO_2$. There remained 10 parts by weight of an activated granular carbon having an internal surface area of 500m²/g and a bulk density of 0.58 g/ml.

EXAMPLE III 2 parts by weight of paraformaldehyde were dissolved in 40 parts by weight of waste sulphuric acid according to Example II. To the mixture obtained were then added with vigorous stirring 10 parts by weight of the rubber according to Example II.

With the development of heat a dry reaction mass was formed, which was continuously metered to a rotary oven heated at 500°C, with sulphur dioxide gas, formed by the reduction of the sulphuric acid, escaping from the oven. The yield was 12 parts by weight of an activated carbon having an internal surface area of 450 m²/g and a bulk density of 0.62 g/ml.

EXAMPLE IV 100 parts by weight of cut up motor car tyres of Example I, but having a particle size of 2 to 3 mm, were mixed in a rotary mixer with 50 parts by weight of sulphur, the mixer being heated for 4 hours at 180°C. After the mixture had been cooled there remained about 145 part by weight of a material in the form of hard crumbs, which were subsequently heated in a rotary oven for 8 hours and the temperature was gradually increased to 800°C. There remained 90 parts by weight of a hard granular carbon having a bulk density of 0.7 g/ml. Activating this product with steam at 850°C, with 30 and 60% combustion respectively, resulted in obtaining products having respectively an internal surface of 520 and 780 m²/g and respectively a bulk density of 0.53 and 0.42 g/ml.

EXAMPLE V 100 parts by weight of the cut up motor car tyres of Example I were mixed in a rotary mixer with 70 parts by weight of sulphur and 30 parts by weight of asphalt. The mixer was heated for 4 hours at a temperature of 180°C. The hard crumbs were subsequently heated in a rotary oven in which the temperature was gradually increased to 900°C over a period of 8 hours. There remained 105 parts by weight of granular carbon. After treatment of the resulting granular carbon with steam at 950°C, it had an internal surface area of 800 m²/g and a bulk density of 0.40 g/ml (65% combustion).

EXAMPLE VI 100 parts by weight of the crumbs of Example IV were mixed in a rotary mixer with 150 parts by weight of 20%-oleum, the temperature being maintained at 40°–50°C by external cooling. Subsequently, the rubber crumbs impregnated with the oleum, but apparently dry, were left for 24 hours. This was followed by heating them in a rotary oven whose temperature was gradually increased to a temperature of 650°C over a period of 8 hours. There remained 90 parts by weight of a hard granular carbon having an internal surface area of 180 m²/g, which was further activated by heating with steam at 850°C. There was obtained 45 parts by weight of an activated carbon having an internal surface area of 780 m²/g and a bulk density of 0.44 g/ml (50% combustion).

EXAMPLE VII 100 parts by weight of rubber crumbs containing a polybutadiene rubber, obtained from a rubber object which had been cut into pieces measuring 1 to 4 mm, were mixed in a mixer with 10 parts by weight of sulphur and 10 parts by weight of a heavy aromatic oil and heated for 4 hours at a temperature of 180°C. After the mixture had been cooled 300 parts by weight of waste sulphuric acid containing 80% sulphuric acid, 10% toluene sulphonic acid and 10% water, were fed to the mixer, which was slowly emptied into a rotary oven. The temperature of the oven was gradually increased to 100°C over a period of 4 hours and subsequently to 850°C over a period of 8 hours. There remained 95 parts by weight of a granular activated carbon, which had an internal surface area of 900 m²/g and a bulk density of 0.41 g/ml after 60% combustion with steam.

EXAMPLE VIII 100 parts by weight of the rubber of Example VII were mixed, with external cooling, with 600 parts by weight of chlorosulphonic acid in a rotary mixer. After 8 hours the crumbs were gradually heated to a temperature of 650°C. There remained 90 parts by weight of hard crumbs of an activated carbon which had an internal surface area of 390 m²/g and a bulk density of 0.65 g/ml.

EXAMPLE IX 10 parts by weight of the rubber according to Example I were subjected to a reaction carried out under the conditions and with the use of the sulphur-containing reactants specified in Table I.

In experiment 2 the reaction was carried out in the presence of liquid $SO_2$, which was used in an amount of 100 parts by weight. The activated carbon was pyrolized at a temperature of 500°C. Upon pyrolysis a highly activated carbon was obtained in an amount listed in Table I and with an internal surface area of about 350 m²/g and a bulk density of about 0.54 g/ml.

Table I

| Experiment | S-containing reactant Type | Amount (parts by weight) | Temperature (°C) | Time in hours | Yield after pyrolysis (parts by weight) |
|---|---|---|---|---|---|
| 1 | $ClSO_3H$ | 100 | 60 | 8 | 9 |
| 2 | $SO_3$ | 30 | 80 (in autoclave) | 8 | 8 |

What is claimed is:

1. A process for preparing an activated carbon which comprises reacting at a temperature of from −20°C to +300°C cut up or ground synthetic or natural rubber with a member selected from the group consisting of sulphur, sulphuric acid, sulphur trioxide, chlorosulphonic acid and sulphuryl chloride in an amount of 0.05 to 12 parts by weight per part by weight of the rubber and thereafter heating the resulting product at a temperature of 350° to 1000°C until a granular activated carbon is obtained.

2. The process according to claim 1, in which a styrene butadiene rubber is used as the synthetic rubber.

3. The process according to claim 1, in which a polybutadiene rubber is used as the synthetic rubber.

4. The product of the process of claim 1.

* * * * *